United States Patent [19]

Mundy

[11] Patent Number: 5,008,555
[45] Date of Patent: * Apr. 16, 1991

[54] OPTICAL PROBE WITH OVERLAPPING DETECTION FIELDS

[75] Inventor: David J. Mundy, San Diego, Calif.

[73] Assignee: Eaton Leonard Technologies, Inc., Carlsbad, Calif.

[ * ] Notice: The portion of the term of this patent subsequent to Jul. 18, 2006 has been disclaimed.

[21] Appl. No.: 346,123

[22] Filed: May 2, 1989

Related U.S. Application Data

[63] Continuation-in-part of Ser. No. 179,496, Apr. 8, 1988, Pat. No. 4,849,643, which is a continuation-in-part of Ser. No. 98,510, Sep. 18, 1987, abandoned.

[51] Int. Cl.$^5$ ............................................ G01N 21/86
[52] U.S. Cl. ..................................... 250/560; 356/376
[58] Field of Search .................... 250/560, 561; 356/1, 356/4, 376, 381, 384–387; 901/47; 33/1 M, 503

[56] References Cited

U.S. PATENT DOCUMENTS

| | | | |
|---|---|---|---|
| 3,529,169 | 9/1970 | Heany et al. | 250/223 |
| 3,589,815 | 6/1971 | Hosterman | 356/167 |
| 3,615,139 | 10/1971 | Bostrom | 356/160 |
| 3,692,414 | 9/1972 | Hosterman et al. | 356/167 |
| 3,700,903 | 10/1972 | Adler et al. | 250/217 |
| 3,735,036 | 5/1973 | Macovski | 178/6.8 |
| 3,782,827 | 1/1974 | Nisenson | 356/120 |
| 3,806,253 | 4/1974 | Denton | 356/157 |
| 3,807,870 | 4/1974 | Kalman | 356/161 |

(List continued on next page.)

FOREIGN PATENT DOCUMENTS

| | | |
|---|---|---|
| 1170179 | 12/1967 | United Kingdom . |
| 1328877 | 10/1970 | United Kingdom . |
| 1405331 | 1/1973 | United Kingdom . |
| 1495279 | 12/1974 | United Kingdom . |

Primary Examiner—David C. Nelms
Attorney, Agent, or Firm—Poms, Smith, Lande & Rose

[57] ABSTRACT

An optical probe for measuring various parameters of bent tube comprises a somewhat V-shaped working head having first and second interconnected arms and slightly inwardly projecting end sections. Light sensitive diode arrays are mounted at the intersecting ends of the arms, and laser diode point light sources are mounted at the projecting end sections for directing sharply defined diverging light beams toward the arrays. A small diameter tube positioned within the sensitive area occludes sections of the light sensitive arrays to enable computation of the position of the centerline of the tube. Moving the probe in a scanning path along the tube enables a large number of measurements to be made for defining points on a best fit line that averages many measurements. From measured slopes of tangents from each laser to the circumference of a large tube of known tube diameter, coordinates of offsets of a point on the tube centerline are calculated. Orientation of the probe at the time of making the tangent measurements is stored, and after an approximate best fit line for the tube centerline has been determined, skew angles between the plane of the probe and the approximate best fit line are employed to correct the centerline point computations to obtain a corrected best fit line.

37 Claims, 6 Drawing Sheets

U.S. PATENT DOCUMENTS

| | | | |
|---|---|---|---|
| 3,818,236 | 6/1974 | Lind et al. | 250/561 |
| 3,829,220 | 8/1974 | Parkinson | 356/160 |
| 3,866,038 | 2/1975 | Korth | 250/236 |
| 3,874,798 | 4/1975 | Antonsson et al. | 356/159 |
| 3,901,597 | 8/1975 | White | 356/4 |
| 3,975,102 | 8/1976 | Rosenfeld et al. | 356/167 |
| 4,105,925 | 8/1978 | Rossol et al. | 250/561 |
| 4,122,525 | 10/1978 | Eaton | 364/560 |
| 4,144,449 | 3/1979 | Funk et al. | 250/221 |
| 4,146,926 | 3/1979 | Clerget et al. | 364/556 |
| 4,158,507 | 6/1979 | Himmel | 356/376 |
| 4,171,917 | 10/1979 | Pirlet | 356/376 |
| 4,192,613 | 3/1980 | Hammar | 356/386 |
| 4,204,772 | 5/1980 | Balasubramanian | 356/376 |
| 4,208,589 | 6/1980 | Dashwood et al. | 250/560 |
| 4,259,013 | 3/1981 | Faxvog et al. | 356/237 |
| 4,290,698 | 9/1981 | Milana | 356/371 |
| 4,297,034 | 10/1981 | Ito et al. | 356/394 |
| 4,322,627 | 3/1982 | Pirlet | 250/561 |
| 4,326,804 | 4/1982 | Mossey | 356/375 |
| 4,339,664 | 7/1982 | Wiklund et al. | 250/577 |
| 4,348,114 | 9/1982 | Neale et al. | 356/431 |
| 4,349,274 | 9/1982 | Steele | 356/1 |
| 4,392,120 | 7/1983 | Mita et al. | 382/22 |
| 4,423,998 | 1/1984 | Inaba et al. | 414/730 |
| 4,440,496 | 4/1984 | Milana | 356/241 |
| 4,465,937 | 8/1984 | Forbes | 250/560 |
| 4,507,557 | 3/1985 | Tsikos | 250/341 |
| 4,555,633 | 11/1985 | Bjorkelund | 250/560 |
| 4,561,776 | 12/1985 | Pryor | 356/72 |
| 4,576,482 | 3/1986 | Pryor | 356/376 |
| 4,622,462 | 11/1986 | Eaton et al. | 250/236 |
| 4,710,760 | 12/1987 | Kasday | 340/712 |
| 4,880,991 | 11/1989 | Boehnlein et al. | 250/560 |

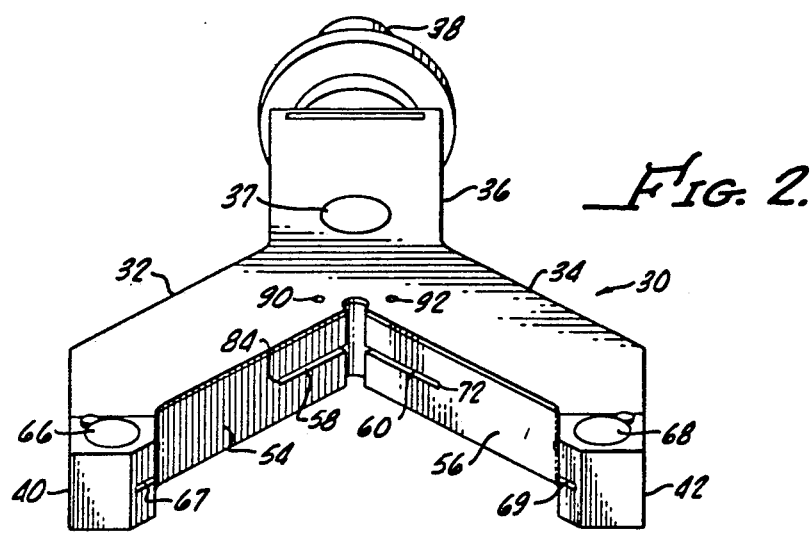
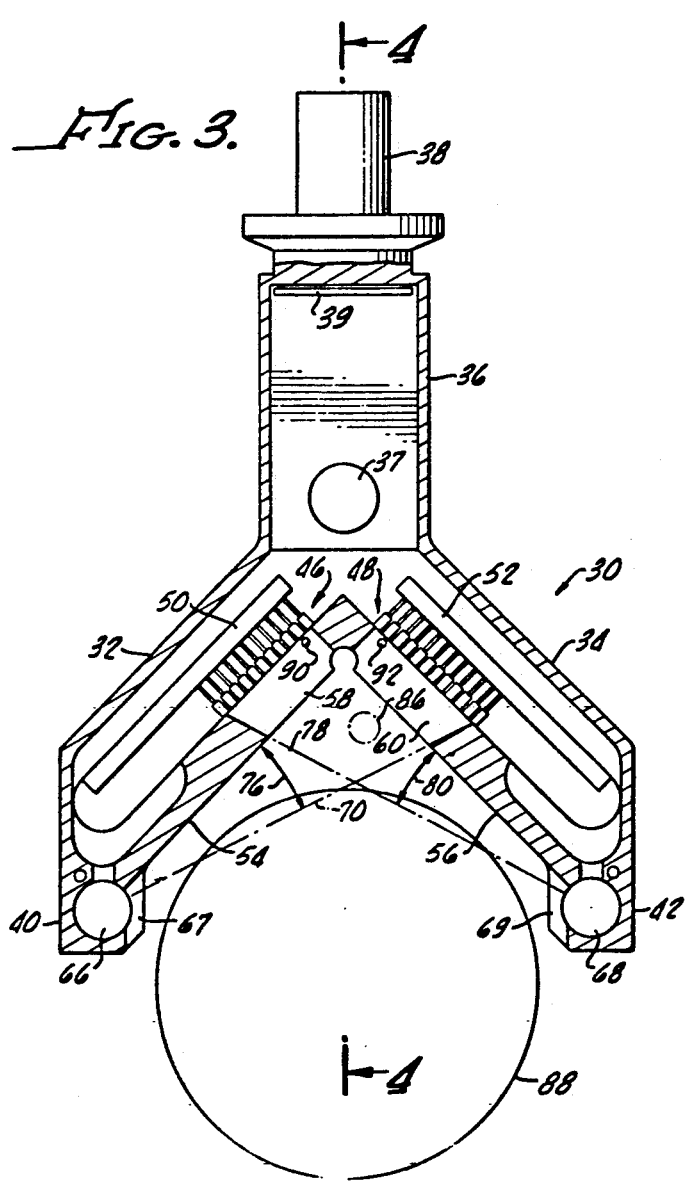
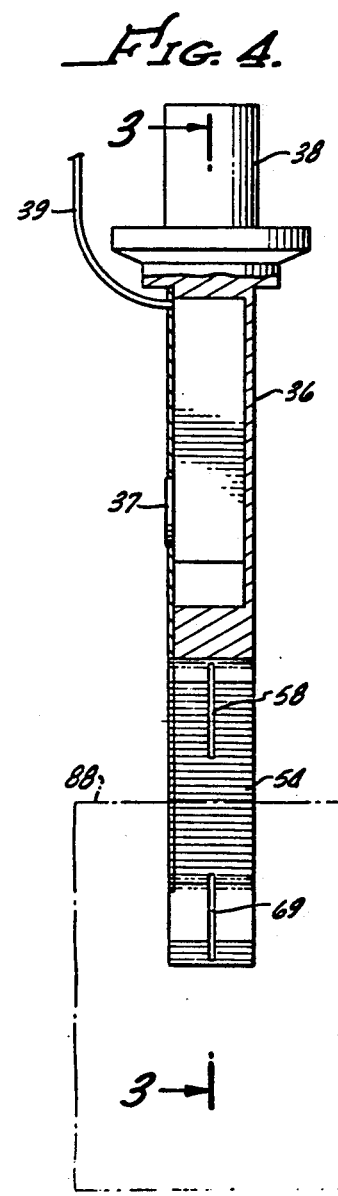

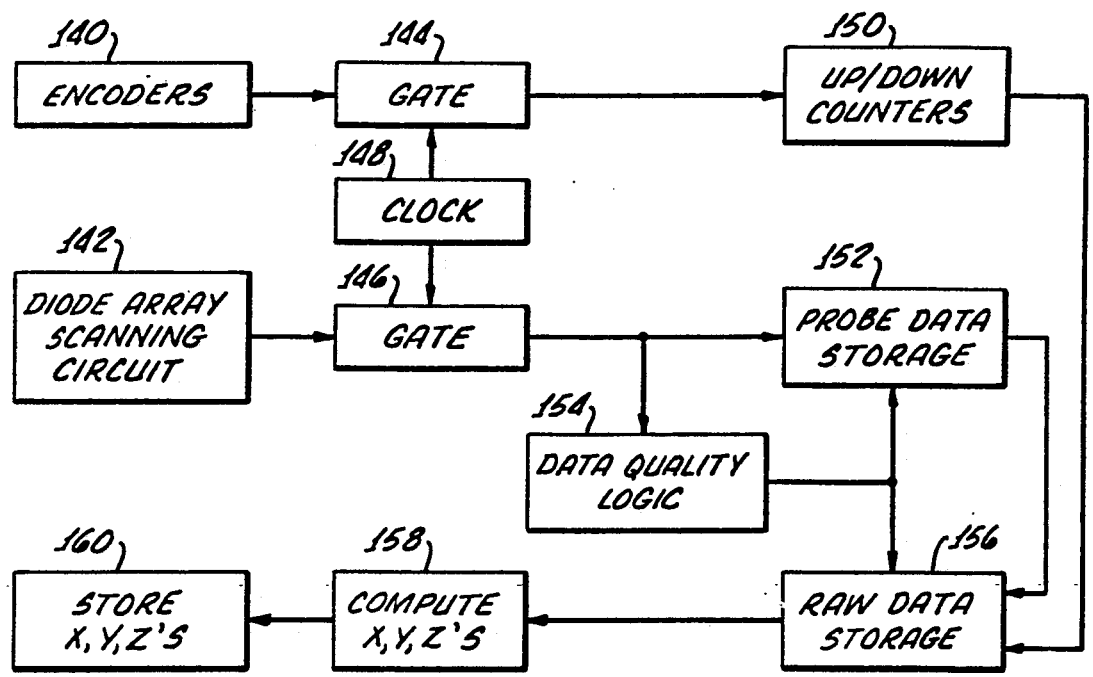
FIG. 5.
FIG. 6.
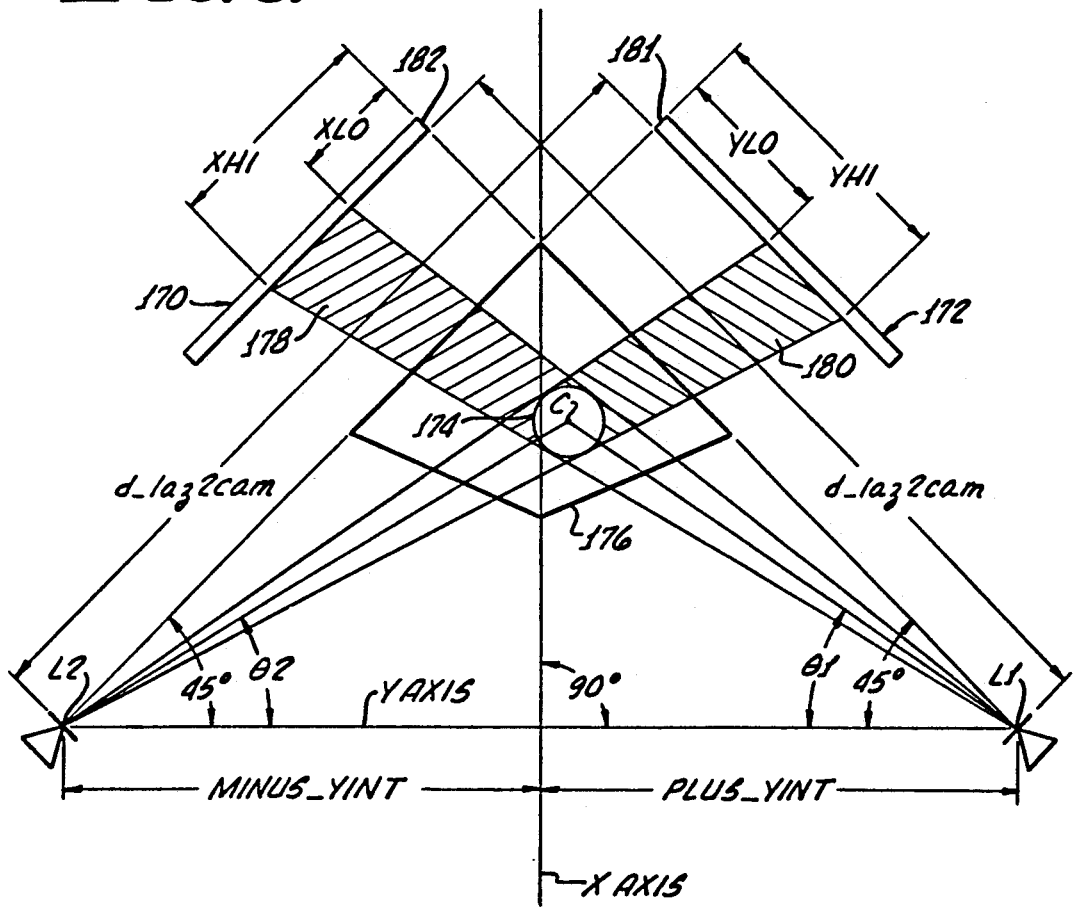

OPTICAL PROBE WITH OVERLAPPING DETECTION FIELDS

This application is a continuation-in-part of application Ser. No. 179,496, filed Apr. 8, 1988, now U.S. Pat. No. 4,849,643 for Optical Probe, which in turn is a continuation-in-part of abandoned U.S. Pat. application Ser. No. 098,510, filed Sept. 18, 1987, for Optical Probe. The disclosures of both of the prior applications are incorporated herein by this reference as though fully set forth.

BACKGROUND OF THE INVENTION

The present invention relates to measuring instruments, and more particularly concerns measurements of the position of a pipe centerline. In U.S. Pat. No. 3,944,798, of Homer L. Eaton, there is disclosed a method and apparatus for measuring position and direction of a pipe centerline by use of a five axis articulated arm, bearing at the free end of the outermost arm a V-shaped working head or probe which may be moved to a number of diverse positions and orientations to contact a pipe upon which measurements are to be made. In general, for measurement of bent pipe, and for bending pipe, it is important to know various parameters, including the length of the pipe straight portions or distance between bends (DBB), the bend angle or degree of bend (DOB), and the plane of the bend angle or plane of bend (POB). By locating vectors lying along the centerlines of the pipe straight portions, the required parameters can be readily calculated. Thus, in order to obtain the necessary information or data to define a bent pipe and its several bends, it is only necessary to obtain data defining the position and orientation of the centerlines of the respective straight sections of the pipe. The position and direction of these vectors can be obtained either by measuring position of two points on each vector, thus defining the vector, or by use of the instrument of U.S. Pat. No. 3,944,798, which enables measurement of the direction of the vector by a single contact between the V-shaped working head and the exterior of the pipe.

The contact probe, or working head, of the pipe of the U.S. Pat. No. 3,944,798 has four contact elements which are positioned so that all of these elements will make electrical contact with the outer surface of the pipe, and thus signify obtaining of a desired relative position and orientation of the pipe centerline with respect to the working head. All of the electrical contact elements must contact the pipe, and thus some time and effort is involved in manipulation of the working head to ensure appropriate contact and appropriate orientation of the working head. This slows the making of the many measurements that are required for defining adequate data for a complete set of pipe bends.

Another problem with the contact probe of the Eaton patent is that the required contact between the probe and some slender, flexible pipes may result in distortion of the pipe, and thus create an erroneous reading of either pipe centerline position or direction. Therefore, in making measurements of very small diameter, slender and somewhat flexible pipes the contact probe of the prior art must be used at an even slower pace and with even greater degree of care to avoid distortion of the pipe by the necessary contact, and thus to avoid erroneous read out.

Accordingly, it is an object of the present invention to provide a pipe measuring probe which avoids or minimizes above-mentioned problems.

SUMMARY OF THE INVENTION

In carrying out principles of the present invention in accordance with a preferred embodiment thereof, a working head includes first and second mutually spaced light sensors and first and second point light sources, mutually spaced from each other and from the sensors to project light beams through a common sensitive region to the sensors. In one mode of operation, both of the arrays have a section of their fields of view occluded by the presence of an occluding object, such as a tube, fully within the overlapping fields of view. Means responsive to the sensors are provided to generate sets of signals that collectively define position of the occluding object relative to the working head. In a particular embodiment the working head comprises a pair of arms fixed to one another at an inner end of each, and each having a point light source mounted at its outer end. The sensors are mounted at the inner portions of the arms and face respective ones of the light sources.

In a second mode of operation, measurement is made of a tube of known diameter having a cross section of which only a part is positioned to occlude the light beams. In fact, no part of the tube being measured need extend into the common overlapping area of the beams, as long as both light beams are partly blocked by the tube. In this mode, tangents to the tube circumference from each of the point light sources are measured, and these tangents, computed at least two points along a straight section of the tube, are used together with known tube diameter to compute points on the tube centerline. Skew angles between the sensing plane of the probe and a computed approximate tube centerline are calculated and employed to compute corrected centerline points, and the correction calculations are repeated.

BRIEF DESCRIPTION OF THE DRAWINGS

FIG. 2 is a perspective view of the working head or optical probe of the instrument of FIG. 1;

FIG. 3 is a section taken through the working head on lines 3—3 of FIG. 2;

FIG. 4 is a section taken through the working head on lines 4—4 of FIG. 3;

FIG. 5 is a simplified, functional block diagram illustrating collection and storage of raw data from the encoders and probe for use of the probe in a scanning mode;

FIG. 6 illustrates certain geometry useful in understanding operation of the probe of FIGS. 1 through 4;

DETAILED DESCRIPTION OF THE INVENTION

The method and apparatus of the present invention are applicable to measurement of positions of various types of objects as may be required for positioning and locating parts and devices used in various assemblies to ensure proper operation. Measurement may be made of sample bent pipes or tubes for use in controlling digitally operated bending machines, and measurements may be made on a completed tube of the bending operations actually carried out. The invention is also useful for measurement of solid rod, as sensing takes place only upon the exterior surface of the object being measured. Therefore, the term pipe or tube as used herein shall mean either hollow or solid objects.

An important application of this invention is the measurement of a sample of bent tube for the purpose of deriving or correcting data to enable subsequent bending of other tubes conforming to the sample. The measurements may also be employed for inspection of a bent tube in an arrangement wherein measurements resulting from operation of the described probe are automatically compared with stored measurements to determine accuracy of the part being measured. Although the optical probe described herein may be employed as the working head of many different types and configurations of measuring instruments, whether employing linear motions, rotations, or some combination of linear and rotational motions, it is described, herein solely for purposes of exposition, as carried by a five axis measuring instrument of the type shown in U.S. Pat. No. 3,944,798. It will be understood that the probe is to be mounted to some type of support or otherwise carried so that the probe can be grasped by an operator and moved through the desired scan paths, to be described below, and so that both orientation and position of the probe in a fixed or reference coordinate system can be measured and determined at least a number of different points of the probe scan.

Figure 1:
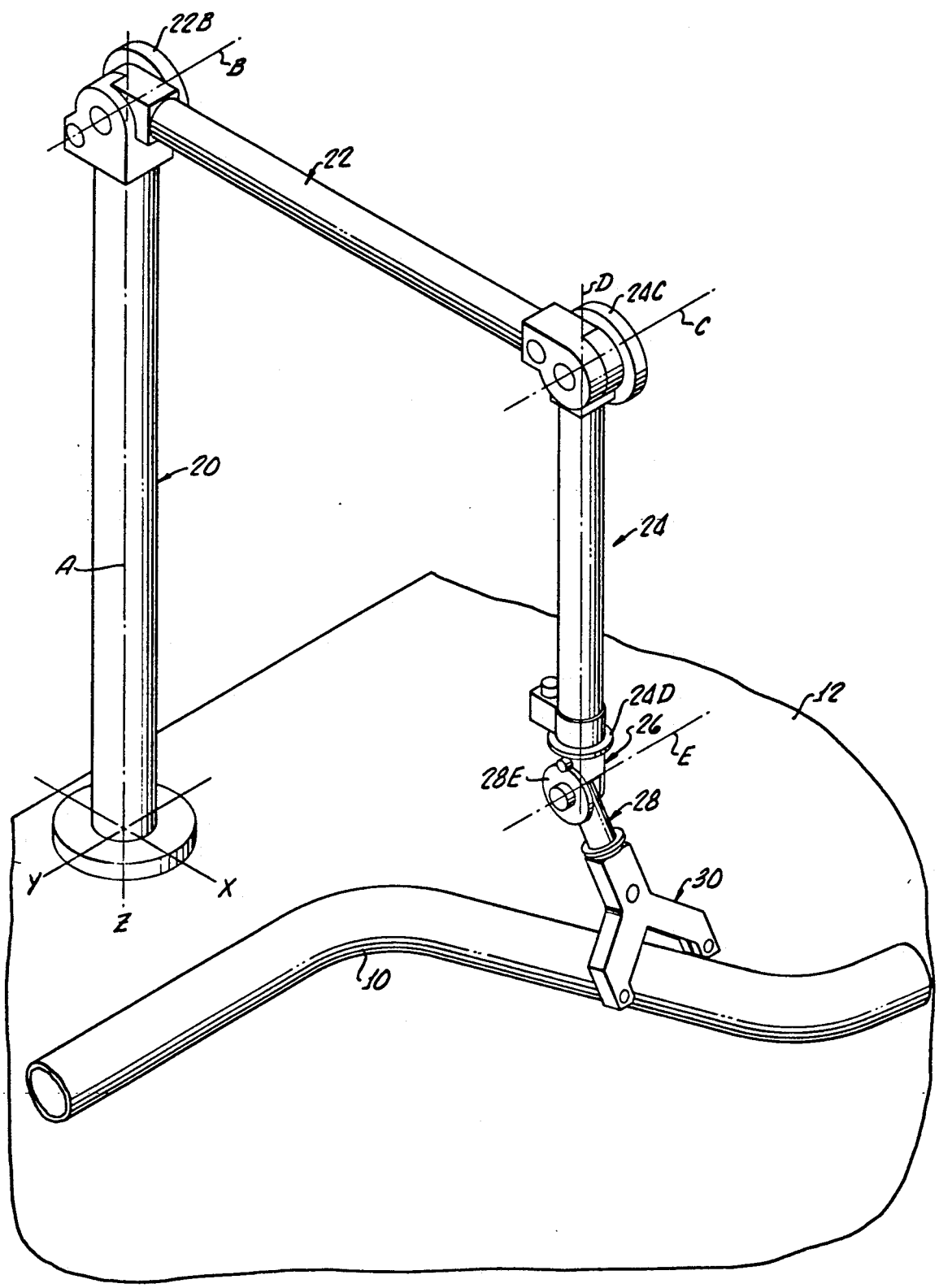
FIG. 1 is a perspective view of a five axis measuring instrument constructed in accordance with principles of the present invention.

Referring to FIG. 1, a sample bent tube 10 is fixedly mounted to a support or work table 12 by means of a pair of clamps or other holding structures (not shown). The tube may be mounted to the table in any one of a number of desired but fixed positions and orientations. The particular position or orientation of the tube may be varied considerably as long as the tube does not move during the course of the measurement cycle. For many purposes, including inspection and manufacture, it is desired to measure certain parameters of the tube 10. These parameters include the length of each tube straight portion (distance between bends), the angle between adjacent straight portions (degree of bend), the plane of each of the bends (plane of bend), and the total length of the tube from end to end. These parameters, after corrections for spring back and other factors, may be employed to calculate commands for an automatic tube bending machine, such as, for example, one of those shown in U.S. Pat. Nos. 4,063,041, 4,201,073, and 4,495,788, or may be fed to a computer in an inspection procedure to check accuracy of the tube being measured. All of these parameters can be determined from position and orientation of centerlines of the several sections of the tube and from the positions of centerline end points.

According to principles of the present invention, data defining the centerlines and end points (or at least two points on the centerlines) may be acquired accurately, rapidly, simply and without contact between the measuring instrument and the tube by means of the five axis measuring instrument illustrated in FIG. 1 and carrying the optical probe shown in the several drawings. Except for the different optical probe or optical working head, the instrument shown in FIG. 1 may be identical to the instrument shown in U.S. Pat. No. 3,944,798.

A significant advantage of the non-contact probe described herein is the fact that for a small size of probe it is capable of measuring tubes of widely different diameters. A typical probe of small size is capable of measuring wire as small as 30 gauge, or smaller, and tubes up to three inches in diameter, where the opening of the probe for receiving the tube to be measured is barely larger than the diameter of the tube.

The measuring instrument of FIG. 1 comprises a first link 20 mounted upon table 12 for rotation about a first axis "A". A second link 22 is pivotally connected to the first link 20 for rotation about a second axis "B", which is normal to axis "A". A third link 24 is pivoted to the second link 22 for rotation about a third axis "C". Rotatably mounted within the third link 24 for rotation about a fourth axis "D" normal to axis "C" and coincident with the axis of the third link 24 is a fourth link 26. Link 26 carries a fifth link 28 for rotation about a fifth axis "E", which is perpendicular to the fourth axis "D". Each of the second, third and fifth links has nearly 360 degrees of rotation relative to its adjacent link. The first link 20 is capable of a full 360 degrees of rotation with respect to the support table 12, and the fourth link is also capable of a full 360 degrees of rotation with respect to the third link, whereby an instrument of relatively small dimensions is able to make measurements on objects of considerably greater dimensions with a very high degree of flexibility.

Angle encoders $22b$, $24c$, $24d$, $28e$ and a fifth encoder (not shown) on axis "A" are mounted to the articulated arms on respective ones of the five axes "B", "C", "D", "E" and "A" for generating encoder signals (probe location data) representing the angular positions of the several links about their respective axes.

Carried with a fixed orientation relative to and by the fifth link 28 is the optical working head or probe 30. This probe replaces the mechanical or other probes of the instrument of U.S. Pat. No. 3,944,798. As shown in FIGS. 2, 3 and 4, the probe 30 is formed of a housing of somewhat inverted V-shape, having first and second arms 32,34 extending at right angles to one another and fixedly interconnected at inner ends thereof. The inner ends of the arms are also fixed to a probe neck 36 carrying a fixed connecting shaft 38 by means of which the probe is fixedly connected to the fifth link 28. A manually operable push button 37 on the probe neck may be pressed and held by the operator to arm the probe to enable it to read its data only while the button is depressed.

The probe housing legs have angulated outer end sections 40 and 42 respectively that project somewhat inwardly from the outer ends of the housing arms 32,34 to define between them a probe opening, the size of which provides an upper limit for the diameter of a tube that can be measured with this probe. The respective probe arms 32,34 carry at their inner ends light sensors 46,48 in the form of linear arrays of light sensing diodes mounted on circuit boards 50,52, respectively, which in turn are fixedly mounted within the probe arms. The diodes face the inner sides of inner walls 54,56 of the probe arms 32,34. These walls are provided with narrow windows or openings 58,60 that extend from the inner mutually adjoining ends of walls 54,56, and, therefore, from the inner ends of the arms 32,34, for a distance, such as about one inch, toward the outer ends of the arms.

Mounted within the end sections 40,42 of the arms are first and second point light sources, such as laser diodes 66,68. The diodes provide point sources of exceedingly intense, sharply defined, divergent light beams having a beam width of approximately 60 degrees. These beams are projected through narrow window slots 67,69 in end sections 40,42. Only a small portion of this beam width is employed in the described apparatus. The useful or effective portion of the beam of laser diode 66 has one edge (an outer edge) indicated by the phantom line 70 in FIG. 3. This edge 70 extends from the effective center of the diode to the outermost edge 72 (FIG. 2) of window 60 in the opposite arm 34, and, through this window to the outermost element of sensor array 48. Although the actual laser beam width may be greater than that indicated and does extend beyond the effective edge 70, none of the additional part of the light will fall upon the sensor array, and such outer portions of the beam are ignored in the operation of the present invention. The inner portion of the beam projected by laser 66 is the surface of wall 54, and thus the effective beam width of laser 66 may be defined by the angle designated at 76 (FIG. 3). Similarly, the beam of laser diode 68, with the diode and its beam being identical to the diode 66 and its beam, except for the position and orientation of diode 68, is defined between an effective outer beam edge 78 and inner wall 56 of arm 34. The effective beam width of laser 68 is indicated by angle 80.

The effective beam widths are defined by the length of the windows 58,60 between the inner ends thereof and the outer ends 84,72.

In an exemplary embodiment the light sensor diode arrays 46,48 have a length of slightly more than one inch and contain 1,024 light sensing diodes each. The arrangements of the laser beam angles and the length of the windows 58,60 are such that each beam is capable of illuminating substantially the full length of the diode array that is oppositely positioned, which array has a field of view directed toward the opposite diode.

Electrical connections between the components of the working head and external computing circuits to be described below are carried by an electrical cable 39 (FIG. 4) connected via the probe neck 36.

Effectively, the probe described herein has a full view sensitive region defined by the overlapping of the two laser beams and contained within the area bounded by windows 58,60 and effective beam edges 76,78. Longer sensor diode arrays, with longer windows, may be used to obtain a larger probe sensitive area. However, a larger sensitive area is not needed when measurements are made in a tangent view mode, to be described below, because, in such mode, only a part of the tube need enter the laser beams.

Means are provided for scanning the light sensing diode arrays to generate signals representing positions within the arrays of the occluded portions of the arrays. The sensor diode read-out signals indicate the number of diodes ("pixels") between an edge of a shadow on the array and one end of the array. Each laser light source, being of very high intensity and sharply defined, provides a sharply defined shadow edge (when the beam is partly occluded by an object within the sensitive region, or an object that breaks only a portion of one of the light beams). Thus a small diameter tube, such as a tube indicated at 86 (FIG. 3), may be positioned entirely within the sensitive zone so that certain ones of the diodes of each array are in shadow, with both edges of the shadow being sharply defined. As will be more particularly described below, identification of the position of the shadow edges on the arrays enables calculation of a set of coordinate defining positions of a point on the centerline of the tube 60. No lenses are needed to provide a sharp, clearly defined shadow edge, nor is any optical arrangement required to increase the length of an optical path as may be required by certain types of lenses. Moreover, the sharply defined, high intensity light produced by the lasers causes the probe to have less sensitivity to adjustment for ambient light or light reflected from a tube being measured. Sensitivity adjustment is easily accomplished because light directly received from the laser is of such greatly increased intensity as compared to any light reflected from the measuring tube or other surfaces, or ambient light. Any of the laser light that is reflected from the tube or other surfaces of the probe is greatly dissipated, and thus is readily eliminated by light sensor array sensitivity adjustment. Moreover, the laser uses considerably less power than other light sources, is more reliable, and has a longer life.

Because the laser point light source requires no lenses nor folded optical path, the probe itself can be made considerably smaller, in fact up to fifty percent smaller than a comparable probe using lenses. In an exemplary embodiment, a probe having the configuration illustrated in FIGS. 2, 3 and 4 has a width of about five inches across the end sections 40,42 to outer sides thereof, a total height of about six and a quarter inches from connecting shaft 38 to the end sections 40,42, and a depth (thickness) of about three quarters of an inch. Neck 36, together with shaft 38, may have a length of about three inches. The probe opening between inner sides of end sections 40,42 is about three and one half inches.

As will be described more particularly below, the probe can be used to measure position coordinates of the centerline of a tube having a diameter that is considerably greater than the area of the probe full view sensitive region. Thus, as illustrated in FIG. 3, a larger diameter tube 88, having a diameter substantially equal to or slightly less than the distance between the inner, mutually facing surfaces of end sections 40,42, may be inserted into the area of the probe to a point where no part of the tube surface falls within the overlapping probe sensitive region. It will be understood that the probe would be used to measure only one or the other of tubes 86,88 at a time, as the two are shown in the same figure only for purposes of exposition. The larger tube is positioned so that portions of its outer surface break at least the outermost edges 70,78 of both laser beams, penetrating the probe inwardly of the outer edges 70 and 78 respectively of these beams. Such a position of a larger tube allows measurement of tangents from the center of the respective laser diodes to the tube periphery. From these tangents, and knowledge of the tube diameter, a set of coordinates of a point on the centerline of the larger tube can be calculated. If the sensing plane of the probe, that is a plane of symmetry that bisects and is perpendicular to inner walls 54,56 of the housing (e.g. the plane of section 3—3 of FIG. 4), is precisely perpendicular to the centerline of the tube when the tangents are measured, such measurements may be used to precisely define position of a point on the centerline. However, if the probe sensing plane is skewed with respect to the tube centerline when the tangents are measured, coordinates of positions of points on the centerline so measured will be in error by an amount depending upon the amount of the skew angles. Therefore, an approximate tube centerline is defined for calculation of skew angles between the probe sensing plane and the approximate tube centerline, and the skew angles are employed to calculate a corrected set of coordinates for the centerline points. The correction step is repeated several times to ultimately obtain a precisely defined tube centerline position, as will be more particularly described below.

Although, as previously mentioned, the probe full view sensitive region for a small diameter tube, such as tube 86, is defined by the housing walls 54,56, or more particularly the windows 58,60 and the light beam effective edges 70,78, the probe also has a tangent view sensitive region for the larger tube, such as tube 88, that includes the smaller full view sensitive region but extends well beyond the area overlapping the beams. The tangent view sensitive region for measurements of a larger tube includes all portions of either of the beams that are inwardly of the effective beams edges 70,78. In tangent view mode, measurement is made of slopes of tangents that extend from the centers of the point light sources to the periphery of the tube. These tangents are effectively the lines that separate those portions of the beams which are occluded by the tube from those portions of the beams that are not occluded by the tube.

The probe in its full view mode, e.g. that mode used for measuring a tube of small diameter that may be entirely contained within the full view sensitive region, may be used to measure two mutually spaced centerline points on each tube straight, and thus define the centerline of the tube straight, or it may be used to measure a plurality of points to more accurately define the centerline. In a presently preferred use of the full view mode, the operation is substantially the same as described in the parent application Ser. No. 179,496. The calculations and geometry in the full view mode are as described in such parent application, it being necessary only to measure the points on the two arrays at which each edge of the tube shadow is positioned, thereby defining the centerline of each shadow. From these centerlines and known probe geometry, the coordinates of the tube centerline in a coordinate system fixedly related to the probe are computed. The articulated arm encoder outputs are also employed to measure both position and orientation of the probe (and of the coordinate system that is fixed to the probe) in the coordinate system X, Y, Z (FIG. 1) that is fixed to the work table 12, whereby the tube centerline points and vectors are known in the fixed coordinate system.

To calibrate the probe, it is necessary to precisely locate the position of the diode arrays with respect to the probe coordinate system. To this end, each probe arm is provided with a small aperture, such as apertures 90,92, which extend perpendicular to and through an upper surface of the arm housing (as viewed in FIG. 2) in a direction parallel to the sensing plane of the diode arrays, and parallel to the extent of the inner walls 54 and 56. The calibration apertures are perpendicular to the probe sensing plane and have a diameter of about fifty thousandths of an inch (0.050 inches) for reception of a calibration pin of like or slightly smaller diameter. With such a pin inserted in hole 90, the area of array 46 that is occluded by the pin has a known position so that location of the array with respect to the probe may be calculated and the read-outs of the array calibrated. Similarly, position of array 48 is calibrated insertion of a like or the same calibration pin in hole 92 which is positioned with respect to array 48 just as is hole 90.

When full view mode is used for scanning, the probe is moved in a scanning path along the tube straight, with the tube being within the full view sensitive area of the probe at all times at which a measurement is made. As the probe is moved along the tube, read-outs of shadow locations on the sensor arrays and encoder angles repetitively occur at a number of probe positions, such as at every ten milliseconds for example, so that a number of tube centerline points can be computed. A best fit line may then be computed from these centerline points to identify and define coordinates of position points on the tube centerline.

The outputs of the diodes of the sensor arrays, e.g. the probe optical data, are sequentially and repetitively read out one by one under control of clock signals from a scan control circuit to provide a series of pulses, as described in the parent application. Concomitantly, outputs of the articulated arm encoders are read-out, indicating angles of the respective arms about the several axes "A", "B", "C", "D" and "E". This angle data, together with the diode array read-out data are fed to a computer to compute coordinates of position of points on the centerline of the occluding pipe 86 with respect to coordinate system X, Y, Z (FIG. 1) fixedly related to the worktable. The outputs of the computer may also be fed to suitable display utilization or recording apparatus (not shown) for use in developing or correcting bending control programs by simply recording measurements made. Computations of probe position and orientation based upon the five angle read-outs are described in U.S. Pat. No. 3,944,798.

In the scanning mode, for each straight portion of a tube, a large number of sets of encoder angle data and probe optical data are collected at spaced positions along the length of a tube straight. These encoder angle data are used to define sets of probe location data that collectively define three dimensional position and orientation of the probe in a fixed coordinate system. The probe optical data derived from scanning the sensor arrays are used to define sets of tube position signals that collectively define a position of a point on the tube centerline relative to a coordinate system fixed to the probe. The raw encoder and probe data are converted into coordinates that identify a collection of, for example, between two and one hundred measured points on the centerlines of the straight. These coordinates are stored. Probe orientation is also computed and stored. For each collection of points, a best fit line is determined and used as the vector of the centerline of the tube straight.

FIG. 5 is a functional block diagram illustrating portions of the electronic read-out and raw data storage involved in probe scan modes. Encoders collectively indicated at 140 (and shown at 22b through 22e in FIG. 1) and the optical probe diode array scanning circuitry, indicated at 142, provide information at suitable intervals, such as ever ten milliseconds, via gates 144,146 under control of a clock 148 that provides a gating pulse at the selected intervals. The encoder pulse data are fed to trigger a set of up/down counters 150, which thus contain a read-out of the angle measured by the respective encoders. The diode array scanning data are fed through gates 146 to probe data storage 152. Data from the diode array scanning circuit are fed to a data quality logic circuit 154, which analyzes the raw data from the scanning circuit of the diode array to determine whether or not a tube has been positioned within the sensitive area of the probe so as to provide a shadow or occlusion on the probe arrays. Effectively, the logic circuit 154 determines whether or not all diodes of both arrays have been illuminated. If all of the diodes receive illumination, there is no occlusion, and there is no acceptable optical data signal. If the scans of both arrays show a pair of transitions of pulses read from the diodes of each array, one such transition going from light to dark, and the next going from dark to light, it is known that an area of the array has been occluded. If both arrays are occluded as described, the data quality is acceptable. Preferably the functions of the data quality logic circuit 154 are performed entirely within the software program.

The diode array scanning data (e.g. probe optical data), is stored in the storage device 152 under control of the quality logic 154 if, and only if, the data are determined to be acceptable. Data from counters 150 and probe data storage 152 are fed to a raw data storage device 156, also under control of a signal from data quality logic 154. Raw data is stored only if the data quality is acceptable. The raw data is fed to a computing circuit 158, which computes the X, Y, Z coordinates of each of the points for which data has been obtained, and these coordinates are stored as an array of point coordinates in a further data storage device 160.

It will be understood that the steps and computations described herein are preferably carried in a standard computer, such as an IBM PC-XT, for example, that is programmed to perform the described functions.

FULL VIEW GEOMETRY

Geometry of computations for the full view mode is illustrated in FIG. 6, which shows an arrangement in which both lasers illuminate full width of the tube in the plane of the probe. In FIG. 6, laser point sources 66 and 68 are indicated at L1 and L2, respectively, with the respective linear diode arrays 46,48 indicated schematically at 170 and 172. The beam width of each of the lasers extends at a sufficient angle to intersect the full length of each array, and therefore a tube, such as tube 174, is in full view of both lasers when it is positioned within the full view sensitive region indicated by the quadrilateral FIG. 176, which defines the overlapping areas of the two beams. The edges of each beam extend beyond both sides of the tube, which forms shadows 178,180 and occludes portions of the array. For the array 170, the distance of the edges of the occluded area from an inner edge 182 of the array are indicated in the drawing by lengths XLO and XHI. For array 172, distances from edge 181 to edges of the occluded area are indicated in the drawing by lengths YLO and YHI.

A sensing plane of the probe, which is a plane of the paper of FIG. 6, contains the probe X axis and Y axis, the latter extending between the lasers L1 and L2. The arrays are positioned at right angles to each other, and the distance from each laser to its associated array is indicated on the drawing by the distance d-laz2cam (distance of laser to camera). The distances from each laser to its array are the same, as the probe is symmetrical about the X axis, which extends midway between the lasers L1 and L2. A line from each laser to the zero end, such as end 182 or 181 of the opposite array, extends at an angle of forty-five degrees to the Y axis. The distance from laser L1 to the X axis is termed "PLUS-YINT", and the distance from laser L2 to the X axis is termed "MINUS-YINT". PLUS-YINT is positive whereas MINUS-YINT is negative. The two are of equal magnitude for the described symmetrical probe.

The tube is always assumed to have circular cross section, which may appear elliptical if the tube centerline is not perpendicular to the probe sensing plane. Although tube tilt affects computations in tangent view mode, as will be described below, it has no effect in full view mode. With the tube 174 positioned entirely within the sensitive area 176, scanning of the arrays 170,172 provides data that defines the quantities XLO, XHI, YLO and YHI. These quantities, in an exemplary embodiment, are actually counts of the number of array elements that are illuminated, or occluded, as the case may be. Thus the distance XLO is actually the illuminated number of diode array elements in such distance multiplied by the size of each diode element or pixel. Accordingly, the angle $\theta 1$ between a line from laser point L1 to the center C of tube 174 is defined as follows:

$$\theta 1 = \frac{1}{2}\left(\arctan\frac{XLO^*\text{pixel-size}}{d\text{-laz2cam}} + 45° + \arctan\frac{XHI^*\text{pixel-size}}{d\text{-laz2cam}} + 45°\right) \quad \text{EQ (1)}$$

where pixel-size is the size of each array element.

The angle $\theta 2$ between the Y axis and the line from laser L2 to the centerline C is defined as follows:

$$\theta 2 = \frac{1}{2}\left(\arctan\frac{YLO^*\text{pixel-size}}{d\text{-laz2cam}} + 45° + \arctan\frac{YHI^*\text{pixel-size}}{d\text{-laz2cam}} + 45°\right) \quad \text{EQ (2)}$$

The slopes of the two lines between the lasers and the center are defined as Slope1 and Slope2 as follows:

Slope1 = SIN$\theta 1$/COS$\theta 1$      EQ (3)

Slope2 = SIN$\theta 2$/COS$\theta 2$      EQ (4)

Solving the straight line equations for the two lines from C to L1 and L2, the X,Y coordinates of the center point C are defined as follows:

$$X = \frac{\text{MINUS-YINT} - \text{PLUS-YINT}}{\text{Slope1} - \text{Slope2}} \quad \text{EQ (5)}$$

$Y = ((\text{SLOPE1} * X) + \text{PLUS-YINT})$      EQ (6)

In a preferred embodiment the computations set forth above, and others referred to herein, are carried out by a suitable program, written in Turbo Pascal for the above described IBM PC-XT computer or equivalent.

TANGENT VIEW GEOMETRY

Figure 7:
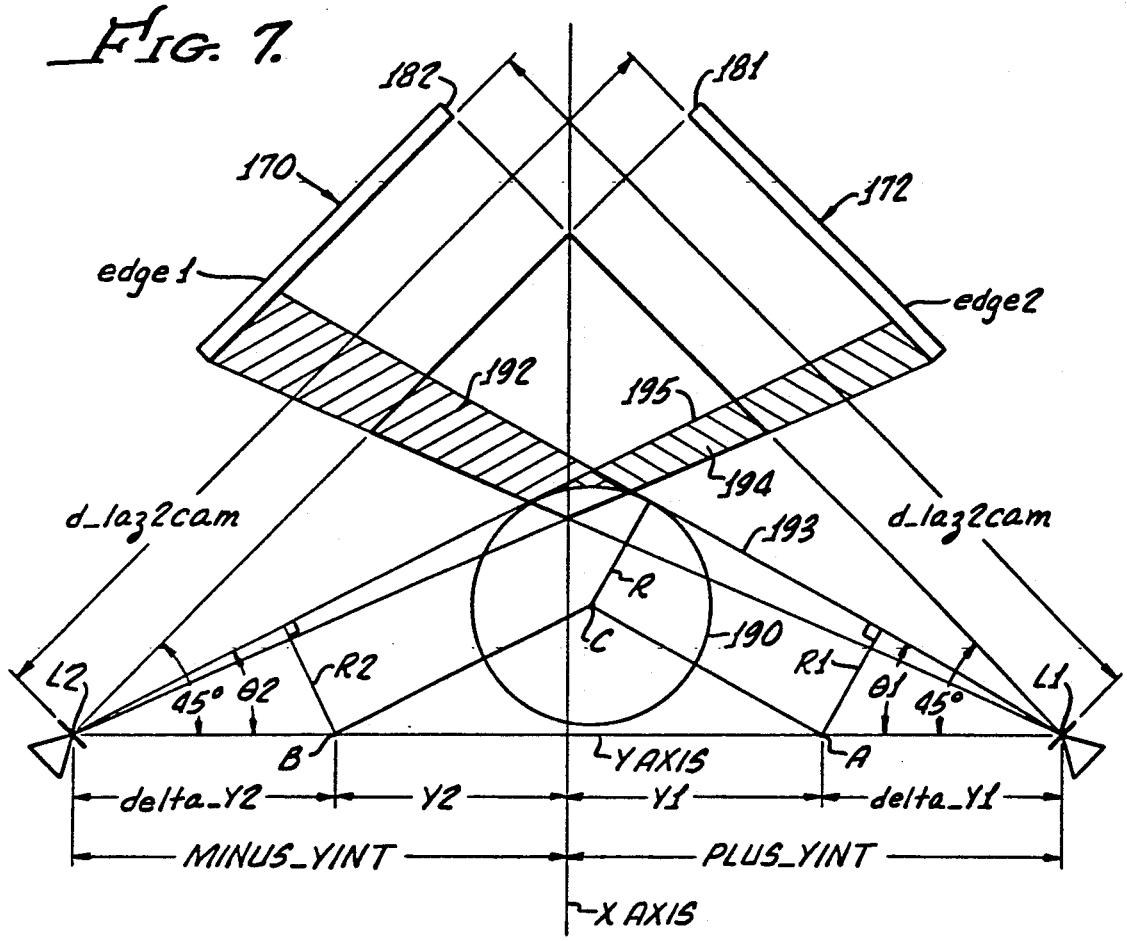
FIGS. 7, 7a, 7b, 7c and 7d illustrate geometry useful in understanding the tangent view operation of the probe.
Figure 7A:
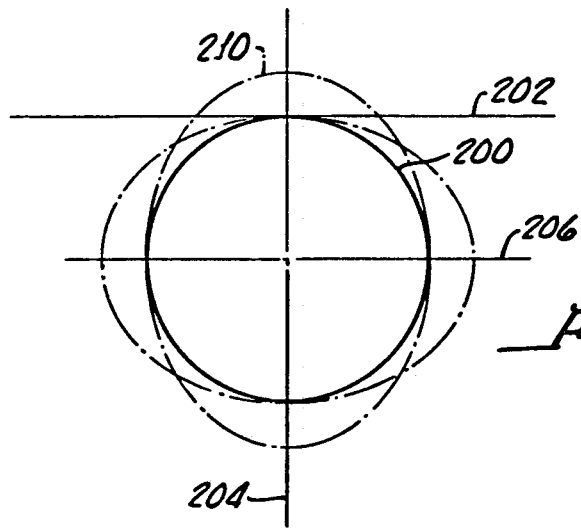
Figure 7B:
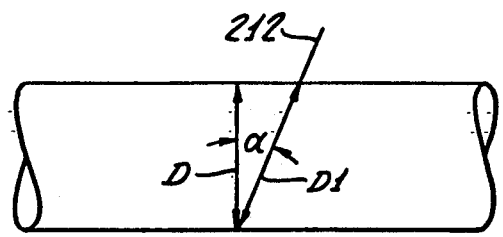
Figure 7C:
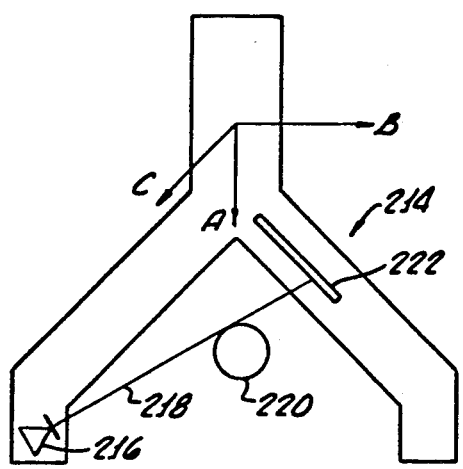
Figure 7D:
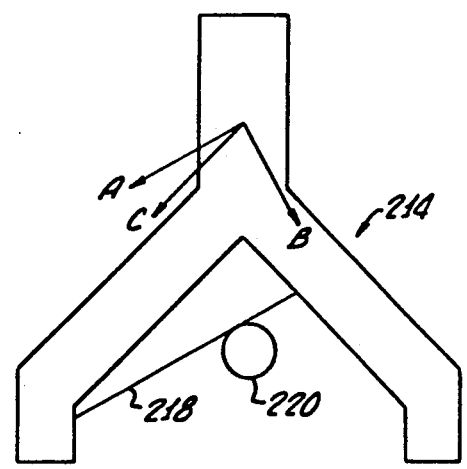

Geometry illustrated in FIGS. 7–7d is useful in explaining the computations for employing the tangent view mode described above. As previously mentioned, in the tangent view mode a tube of much larger diameter may be measured, and only a portion of the tube need occlude the laser beams. In fact, a major portion of the tube may be entirely outside of both beam widths. Moreover, the tube may be stationary relative to the probe when the measurements are made, and it is not necessary to know or determine the velocity or path of the probe in its motion relative to the tube to the measuring position. The probe need not be moved toward the tube to cause an initial breaking of the light beams, but, once the tube is partly illuminated by the two lasers, the probe may be moved along the tube in a scan path that causes the tube to continuously remain within the effective beam width. The tube may move out of one or both the beams, momentarily, during a scan, but no measurements are made unless the tube is illuminated by both beams. Basically, the measurements are static and totally independent of motion of the probe to the measuring position. Although the measurements may be considered to be static, the probe need never actually be stopped (although it may be stopped) during a scan along one straight.

In tangent view mode, slopes of first and second tangents to the tube from each of the lasers are measured, and from these tangents, knowing the diameter of the tube, and probe geometry, offsets to the centerline of the tube from the probe X and Y axes are determined. Thus, as illustrated in FIG. 7, lasers L1 and L2 are spaced from the X axis of the probe by positive length PLUS-YINT and the negative length MINUS-YINT, which, as previously described, are preferably equal in a preferred embodiment. Each laser is spaced from its array by the same distance, which is denoted in the drawing as d-laz2cam.

In the example of FIG. 7, a circular cross section tube 190 of known radius R is positioned in an exemplary measurement position so that a major portion of the tube is outside of the field of view of either of the lasers, and only a portion of the tube intercepts the outermost edge portions of both laser beams. Thus, the outer edge of laser L1 intercepts a portion of the tube, providing a shadow area 192 that occludes a portion of array 170, having an innermost edge indicated in the drawing as "edge1". Similarly, the beam of laser L2 is occluded to provide a shadow 194 that occludes an outermost portion of array 172, having an inner edge of the occluded portion indicated as "edge2" in the drawing. Note that the tube need not be within any part of the overlapping area of the beams, although it may enter some portion of the overlapping area. It is only necessary, in the tangent mode, that each beam have its outermost edge penetrated by the tube for measurement of distances between edge1 and edge2 and the respective inner ends 182 and 181 of the arrays. The tangents from the lasers to the tube are denoted by lines 193,195 in FIG. 7. The computations assume that the tube is illuminated by both lasers when measurement of the tangents takes place. Thus the tube has the same position relative to the probe for both tangent measurements.

In the computations of tube centerline coordinates in tangent view mode, it is initially assumed that the tube axis is perpendicular to the probe sensitive plane, namely the plane containing X and Y axes of the probe coordinate system. This is the plane of the paper in FIG. 7. The probe measurements, as described above, measure slopes of the two tangents to the tube. Knowing these slopes, the tube radius and probe geometry, coordinates of a point in the probe plane on the tube centerline can be determined. The desired point is the intersection of lines AC and BC (FIG. 7) that are respectively parallel to tangents 193 and 195. Lines AC and BC are spaced from the respective tangents by the known tube radius R. The distances of lines AC and BC from the respective tangents are actually R1 and R2 respectively if the tube centerline is not perpendicular to the probe plane. However, initially R1 and R2 are assumed to be equal to each other and to R, and a first set of approximate coordinates is computed. The Y intercepts of lines AC and BC are spaced from L1 and L2 by distances denoted as delta-Y1 and delta-Y2.

In the computations for the tangent view mode, the angles $\phi 1$ and $\phi 2$ of the two tangents relative to the Y axis are initially computed as follows:

$$\phi 1 = \arctan((\text{edge1} * \text{pixel-size}) / \text{d-laz2cam}) + 45°) \quad \text{EQ (7)}$$

$$\phi 2 = \arctan((\text{edge2} * \text{pixel-size}) / \text{d-laz2cam}) + 45°) \quad \text{EQ (8)}$$

where edge1 and edge2 are the number of illuminated sensor elements, and pixel size is the width of a single element of the array.

Knowing the angles of the tangents 193 and 195, lines AC and BC which are respectively parallel to the tangents, and which extend through the tube center C, can be constructed to intercept the Y axis at points A and B respectively. The length delta-Y1 and delta-Y2 are computed using the angles $\phi 1$ and $\phi 2$ of tangents 193, 195, and the distances R1 and R2 as follows:

$$\text{delta-Y1} = ((R1 \cos \phi 1 / \sin \phi 1)^2 + R1^2)^{\frac{1}{2}} \quad \text{EQ (9)}$$

$$\text{delta Y2} = ((R2 \cos \phi 2 / \sin \phi 2)^2 + R2^2)^{\frac{1}{2}} \quad \text{EQ (10)}$$

As mentioned above, R1 and R2 are assumed to be equal to each other and to the known tube radius R, for the initial computation.

In a manner similar to that indicated in equations (5) and (6), approximate X and Y coordinates of the point C on the tube centerline may now be computed as follows:

$$X = \frac{\text{MINUS-YINT} - \text{PLUS-YINT} + \text{delta-Y1} + \text{delta-Y2}}{\text{Slope1} - \text{Slope2}} \quad \text{EQ (11)}$$

$$Y = -((\text{SLOPE}) * X) + \text{PLUS-YINT} - \text{delta-Y1} \quad \text{EQ (12)}$$

SKEW ANGLE CORRECTION

The description of tangent view mode geometry and computations discussed in connection with FIG. 7 is accurate if, and only if, the sensing plane of the probe, which is the plane containing both X and Y axes, is perpendicular to the centerline of the tube. If the tube centerline is not perpendicular to the sensing plane of the probe, and in almost all cases such perpendicularity cannot be maintained when taking an actual measurement, the apparent diameter of the tube increases. This is illustrated in FIG. 7a, which shows a tube 200, having a tangent 202. Axes indicated at 204 and 206 are illustrated in this drawing as being respectively perpendicular and parallel to the tangent 202. In the sketch of FIG. 7a, the plane of the paper contains the plane of the probe, and the tube 200 is illustrated as having a circular cross section in the plane of the probe. If the tube centerline is precisely perpendicular to the probe plane, then the tube cross section is a circle. If the tube 200 is rotated by a small amount about the axis 204, the intersection of the tube with the probe sensing plane will be as indicated by dotted lines 208, with the tube diameter being elongated in a direction parallel to tangent 202 but having the same dimension in a direction perpendicular to the tangent. If the tube 200, on the other hand, is tilted slightly about the axis 206 which is parallel to the tangent, its apparent diameter 210 is increased in a direction perpendicular to the tangent, but remains unchanged in a direction parallel to the tangent. Thus the tangent view computations must correct for those skew angles or tilts of the tube relative to the plane of the probe that will cause an increase of apparent tube diameter in directions perpendicular to the respective tangents. The two tangents to the tube are at different orientations so that there must be a separate skew angle correction for each.

As illustrated in FIG. 7b, a tube 211 having a diameter D, if tilted through a skew angle $\alpha$, relative to a probe plane indicated at 212, has an apparent or increased diameter D1 that is equal to $D/\sin \alpha$. Such a skew angle is computed for each tangent in order to provide corrections for the offsets computed in the tangent view mode.

When each tangent measurement is first made, the skew angle cannot be computed, because the centerline of the pipe has not yet been determined. Thus, in the tangent view mode, the probe is caused to make a preferably continuous scanning pass over a tube straight, reading out tangent data (from the sensor arrays) and probe location data (from the articulated arm encoders). A set of probe location data defines the position and orientation of the probe at the time that the tangent data are obtained. The scanning motion for tangent view mode is the same as that for full view mode, but only a part of the tube cross section need be maintained in the tangent view sensitive area of the probe during this scan. Although a full scan, in which many points on the tube centerline is preferred to effectively average a large number of measurements, it will be understood that it is necessary to define only two spaced points to enable a complete definition of the centerline.

Having completed a scan and stored probe location and tangent data at each of a number of measuring positions of the probe in the course of its scan, sets of approximate X,Y offsets of the tube centerline from the probe coordinate system are calculated for each of a selected number of the probe measuring positions (assuming R1=R2=R). The probe measuring positions are simply those at which both probe location and tangent data are read out. These calculations yield a number of points on an approximate tube centerline which would be precisely defined only if the plane of the probe at all measuring positions of the scan had been perpendicular to the centerline of the tube. Since this is not likely to be the case, each computed centerline coordinate set, computed from the sensed tangent data, is corrected for the apparent increase of tube diameter caused by the probe skew angles. To do this, an approximate best fit tube centerline is first defined. This is done either by a multiple regression procedure described in the co-pending application Ser. No. 179,496, or, preferably, by means of a least squares method to be described more particularly below.

Having defined an approximate tube centerline, and having stored probe location data which includes data defining the orientation of the probe, the skew angles for each tangent at each of the measuring positions of the probe may be computed. Using the computed skew angles, a first pair of corrected radii, R1 and R2 are computed and sets of X,Y coordinates of the tube centerline in the probe coordinate system are recomputed (as described above) to obtain a first set of corrected centerline points. A first corrected best fit line is then computed based upon the corrected centerline points. A second set of skew angles is then computed for the first corrected best fit line, and a second pair of corrected radii determined to enable a second set of corrected tube centerline points (actually the third set of centerline points) to be computed. A third best fit line or a second corrected best fit line is computed from the last computed centerline points. This series of re-computations and corrections may be carried out additional times. However, three repetitions of this correction procedure, repetitions which provide a fourth best fit line, are sufficient to provide reasonably desired accuracy, since it has been found that further repetitions provide little useful increase in accuracy.

For skew angle determination, orientation of the probe in a fixed coordinate system, fixedly related to the work table, is calculated from the probe location data read from the articulated arm encoders. The probe orientation is described by three vectors. These are depicted in FIG. 7c, which schematically illustrates a probe 214 with one of its laser diodes 216 defining a tangent 218 to a tube 220, which occludes a portion of a sensor array 222 of the probe. Vectors identified as A and B in FIG. 7c lie in the plane of the probe and correspond to the X and Y axes of FIGS. 6 and 7. Vector C is perpendicular to the plane of vectors A and B, which plane defines the sensing plane of the probe.

To determine the skew angle for tangent 218, the coordinate system defined by vectors A,B and C is first rotated through the angle of slope of the tangent 218 about vector C, which causes vector A to be parallel to the tangent 218. This position is illustrated in FIG. 7d.

Now a vector is found that is perpendicular to the plane of vector A and the vector of the tube centerline. This perpendicular vector is the vector cross product of the tube direction and vector A.

$$\text{PERP} = \text{XPDT (Tube-dir, Adir[1])} \qquad \text{EQ (13)}$$

where PERP is the perpendicular to the plane of A and the tube centerline, Tube-dir is the vector of the tube centerline, Adir[1] is the vector A, and XPDT denotes the cross product.

Finally, the skew angle needed for the correction is determined by the dot product of the vector PERP and the vector B. The dot product defines the angle between the two vectors.

$$\alpha = \text{DPDT (PERP, Adir[2])} \qquad \text{EQ (14)}$$

where $\alpha$ is the skew angle, measured in a plane perpendicular to the tangent 218 between vectors PERP and B, where Adir[2] is the vector B, and DPDT denotes the dot product. The actual tube diameter is divided by this angle to obtain the apparent radius R1 or R2, as indicated in FIG. 7b. Computations of the X,Y offsets of the centerline in the tangent mode, as indicated in FIG. 7 and Equations (9), (10), (11) and (12) are repeated, using R1 and R2. The corrected X,Y coordinates of centerline points are used to compute a corrected best fit line. These computations are repeated several times, as mentioned above.

BEST FIT DETERMINATION

As previously mentioned, a best fit line may be determined by use of a multiple regression technique. It is presently preferred, however, to determine the best fit line by utilizing the least squares method set forth in pages 462–465 of the text *Basic Technical Mathematics*, Second Edition, by Allyn J. Washington.

Briefly, as described in the Washington text, the best fit method is performed by finding a best fit in two dimensions, such as X and Y for example, using the method of least squares. According to this method of least squares the sum of the squares of deviations of all points from the best fit line is the least it can be. The deviation of each point is determined, the deviation is squared, and the minimum sum of all such squares is determined to find the best fit line. Having found a best fit line in two dimensions, such as the X,Y dimension, a best fit line in a third dimension, either the X,Z plane or the Y,Z plane, is then determined. That one of the X,Z and Y,Z planes is chosen for the second best fit line which has the most deviation over the set of data used.

Figure 8:
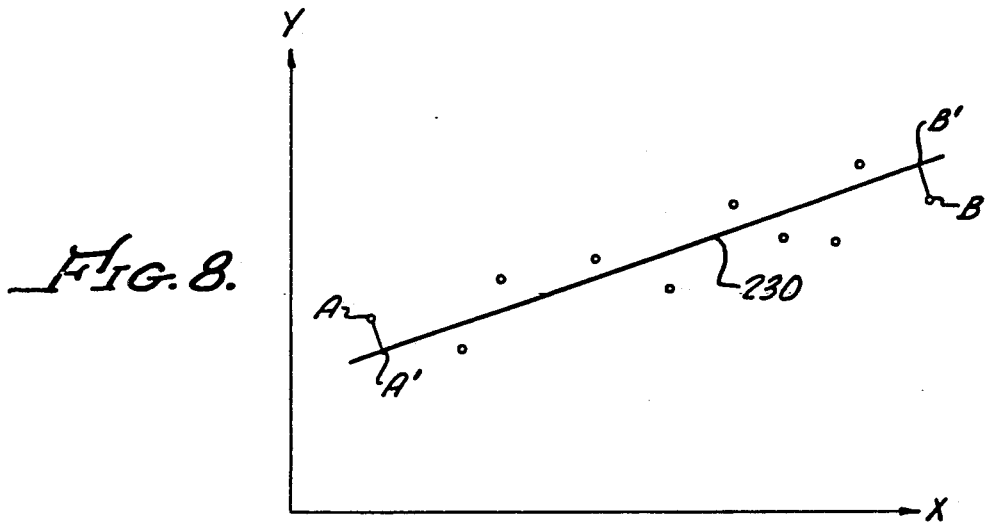
FIG. 8 illustrates aspects of finding a best fit line.

To find the ends of the best fit line, first and last points A and B, as shown in FIG. 8, are moved to the best fit line 230, moving these in directions perpendicular to the best fit line, to points A' and B'. This is done by finding lines BB' and AA' through the first and last points A,B that are perpendicular to the best fit line and determining the intersections A', B' of such perpendicular lines with the best fit line to determine end points.

Having found a best fit line for the X, Y dimension, and for the X,Z dimension, for example, the first and last points on the set in X,Y are moved perpendicular to the best fit X,Z line in a direction perpendicular to the latter. The new positions of these end points are the intersections of the X,Z best fit line with the lines perpendicular to the X,Z line and through these end points. The Z coordinates of the X,Z line are then used as the third coordinate for such end points.

END POINT FINDING

From the positions of the centerlines of the straight portions other tube bend data, such as degree of bend, plane of bend and distance between bends, may be calculated. It often is also necessary to locate each end of the tube centerlines, that is, the free end of each of the two endmost straights of the tube. Tube end points are found after the tube digitizing (e.g. after determination of tube centerlines) has been completed, as described above for the endmost tube straights.

Figure 9:
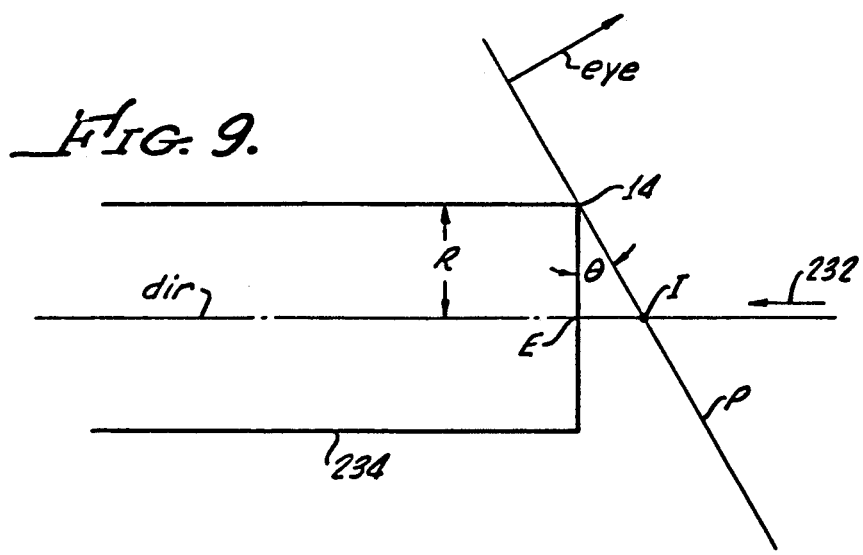
FIG. 9 illustrates geometry for determining tube end points.

After having completed the correction to calculate the corrected best fit line for the centerline of an endmost straight, the operator moves the probe a short distance away from the tube end and presses the button 37 which starts the probe searching and reading. The probe is then slowly moved, held with its sensing plane reasonably perpendicular to the centerline of the end straight, toward the tube from a position beyond the tube end to cause the tube end to penetrate the sensing plane of the probe. End point finding is based on readouts at the position in which the tube end initially breaks the probe sensing plane. At the first occurrence of a shadow on either sensor array, the first set of data is read. For the purpose of this discussion it is assumed that the sensing plane of the probe is perpendicular to the plane of the paper of FIG. 9, but not perpendicular to the tube centerline, and lies along the line P. Referring to FIG. 9, the probe is moved in the direction of arrow 232 toward the free end of a tube 234 of radius R. As the end of the tube penetrates the sensing plane of the probe and first breaks parts of at least one of the laser beams, a tube end "corner", such as point 14 on the free end of the tube will be the first point located by the scan of the sensor arrays. Effectively the probe has found the intersection of its sensing plane with a theoretical tube of zero diameter. This will be corrected for the actual tube diameter, which is known for this end point computation.

Upon the occurrence of the first read-out of one of the probe sensors, the outputs of the articulated arm encoders are read and stored, and the outputs of the diode array sensors are stored. The encoder outputs are employed, as previously described, to compute and define the plane containing the probe sensitive region. A vector perpendicular to this plane is denoted "eye" in FIG. 9.

The desired tube end point is a point E, which is the intersection of the tube centerline with a plane perpendicular to the centerline through "corner" point 14. Point E is displaced from point I by the distance EI. The distance EI is computed as follows:

Angle $\theta$, between the probe sensing plane and the tube centerline, is computed as the absolute value of the dot product of the tube centerline vector and the vector defining probe orientation.

$$\cos \theta = \text{ABS (DPDT (dir, eye))} \qquad \text{EQ (15)}$$

where dir is the vector of the tube centerline, and eye is the vector (perpendicular to the probe sensing plane) that defines probe orientation.

$$\sin \theta = (1-(\cos\theta)^2)^{\frac{1}{2}} \qquad \text{EQ (16)}$$

$$EI = (R/\cos\theta) \sin \theta \qquad \text{EQ (17)}$$

Now it is only necessary to combine the length of line EI with the coordinates representing point I to define the desired end point E. This procedure is repeated for the second tube end point.

To summarize the tube digitizing, which defines the tube centerline, the following steps (1) through (8) are performed while the read-out button 37 is pressed:

(1) Move the probe in a scan path along the tube straight.
(2) Read sensor (camera) data.
(3) Read arm encoder angles.
(4) Convert camera data to X,Y offsets from the center of the probe in the probe fixed coordinate system.
(5) Convert the arm encoder counts to X,Y,Z positions and orientation of the probe in the table fixed coordinate system.
(6) Add the X,Y, offsets to the probe X,Y,Z positions to define X,Y,Z coordinates of points on the centerline of the tube.
(7) Store the tube centerline X,Y,Z coordinates.
(8) Store the X,Y,Z probe position coordinates and probe orientation for each measured point.

The above steps are performed for a large number of points in the course of a single scan of one tube straight.

Then an approximate best fit line based upon the stored tube centerline X,Y,Z coordinates is calculated.

The following group of two steps is performed three times for tangent view mode:

(1) Correct each set of tube X,Y,Z centerline coordinates based upon the last calculated best fit line direction and the stored probe orientation.
(2) Calculate a corrected best fit line through the corrected X,Y,Z coordinates.

The steps performed in finding tube end points may be summarized as follows:
(1) Find the best fit line (tube direction) for the straight section of this endmost straight of the tube.
(2) Press the probe read-out button.
(3) Move the probe from beyond the end of the tube to the tube end.
(4) Wait for the first bit of the tube to show on either sensor and read out sensor data.
(5) Read encoder angles at the time of read-out of the first bit of sensor data and find the probe sensing plane.
(6) Intersect the probe sensing plane with the tube best fit line (tube direction) to find the end point of a zero diameter tube (the intersection of the tube centerline with the probe sensing plane).
(7) Add in the correction for actual tube diameter (add in the length EL).

FLOW CHART

Figure 10:
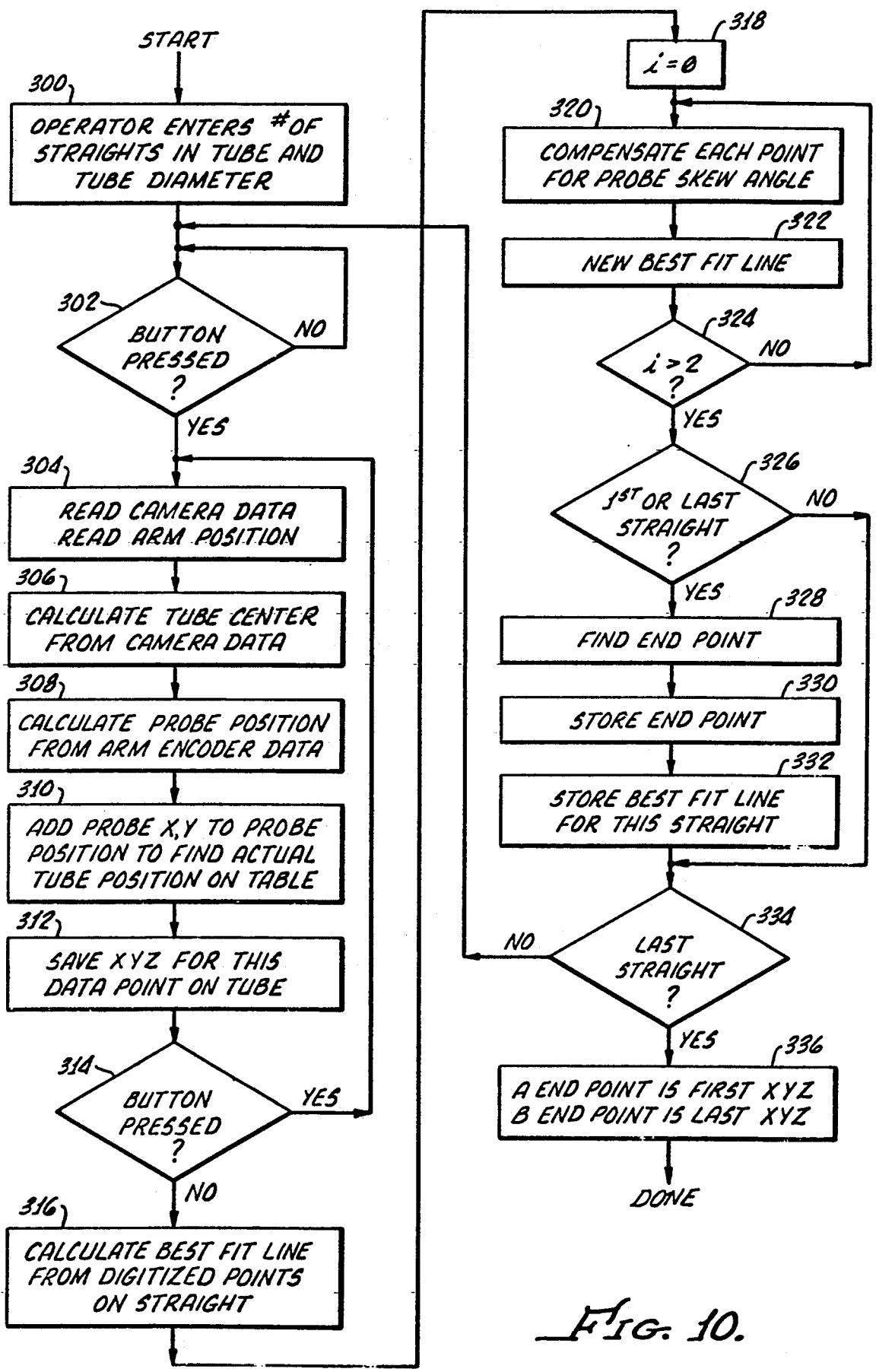
FIG. 10 is a flow chart of operations performed in a digital computer program that carries out the scanning mode and computations of the described probe.

Illustrated in FIG. 10 is a flow chart that describes a computer program, which may be written in Turbo Pascal, for a computer, such as an IBM for example, to perform the measurements described herein. As indicated in block 300, the program requires initial input by the operator of the number of straight sections of the tube to be measured and the tube diameter. The program then waits for button 37 to be pressed, block 302, and then effects read-out of both camera and articulated arm encoder data, block 304. The X,Y offsets of the tube centerline are then calculated from the camera data, block 306, and the X,Y,Z positions of the probe are calculated from the arm encoder data, block 308. To find actual tube position in the table fixed or reference coordinate system, the probe X,Y offsets are added to the probe X,Y,Z position, block 310, and the resulting X,Y,Z coordinates of a point on the tube center are then stored, block 312. These steps are repeated many times during a scanning pass along one straight, as long as the button 37 on the probe remains pressed, as indicated in block 314. If the button is no longer pressed, a scan of one straight has been completed, and a best fit line may be calculated from the stored X,Y,Z positions of the centerline points, block 316.

Since the skew angle compensation is to be carried out three times, a compensation counter is set to zero, as indicated in block 318. Then each of the stored data points is compensated for probe skew angle, block 320, a new best fit line calculated, block 322, and the compensation counter incremented. If the count of the compensation counter is not greater than 2, block 324, the skew angle compensations are repeated. If the compensation calculations have been carried out three times, a determination is made as to whether the straight for which the best fit line has just been calculated is the first or the last, block 326. If the skew angle compensations were performed on the first or last straight, then the end point of such straight is determined, block 328, as described above in connection with FIG. 9, and the end point so determined is stored, block 330. After storing this end point for the first or last straight, or if the skew angle compensation calculations have been carried out on a straight other than the first or last (so that no end point for such straight exists), the best fit line for this last calculated straight is then stored, block 332. It is most convenient to store the straight as the coordinates of two spaced points on the straight. If it is determined that the compensation calculations have been carried out on the last straight, block 334, the first and last X,Y,Z coordinate set for centerline points are identified and employed as the end points of the first and last straights, block 336. A counter is employed to keep track of the number of straights and will readily indicate when a straight being measured is the first in a series and also when the measured straight is the last, by comparison to the total number of straights entered by the operator.

Now the program has completed essential measurements of the tube, having defined the centerlines of the straights of the several tube sections and also defined the end points of the first and last straights. Further data concerning the bent tube, such as, for example, identification of intersections of the various straights, may then be calculated.

To convert read-outs of encoders on the several articulated arm axes, common and well known vector computations procedures are employee. Two vector operations are employed, which are vector ADD (VRAD) for translation, and rotate axis (ROT-AXIS) for rotation. The VRAD operation adds a length L along a vector direction in three dimensional space, with the form of the operation being VRAD (L, start point, direction vector, finish point)

The operation ROT-AXIS rotates a frame of reference, a three directional coordinate system of three mutually perpendicular vectors, about one of the vectors and takes the form ROT-AXIS (axis 1, axis 2, angle, frame of reference)
This form indicates rotation of axis 1, such as the X axis of FIG. 1, and axis 2, such as the Y axis of FIG. 1, through a selected angle about the third axis 3 or the Z axis of FIG. 1, to thereby rotate the entire X,Y,Z reference frame through the selected angle about the Z axis.

As previously mentioned, it is necessary to find the orientation of the probe in the table fixed reference system X,Y,Z of FIG. 1. To find this orientation, we start at the origin, which is the base of the mast or vertical arm 20 (as it intersects the plane of the table 12 of FIG. 1), and translate and rotate successively along all of the sections of the mast (e.g. articulated arm) to reach the probe. We will rotate by the amount of the angle read from the respective encoders and translate by the length of the several arms. Starting at the origin, where X,Y and Z are zero, the coordinate system is translated along the Z axis by the length of arm 20.

VRAD (length 20, point, EYE-DIR [3], point 1)         EQ (18)

where "point" is the starting point or origin of the table fixed reference system, point 1 is the point to which the first point is translated, and EYE-DIR [3] is the direction of the Z axis.

Next the translated frame of reference is rotated to account for the encoder read-outs on the axes A and B of FIG. 1, as follows:

ROT-AXIS (1, 2, angle A, EYE-DIR)         EQ (19)

ROT-AXIS (3, 1, angle B, EYE-DIR)         EQ (20)

where EYE-DIR is the frame of reference, 1, 2 and 3 are the respective X,Y,Z axes, and angles A and B are the angles measured by the encoders on axes A and B respectively.

Now the point 1, which was originally the origin of the fixed coordinate system, is at the top of arm section 20, and the frame of reference axis [1], which is the X axis of FIG. 1, now points along the axis of arm 22. The reference system is then translated along the length of arm 22 by $$\text{VRAD (length 22, point 1, EYE-DIR [1], point 2)} \quad \text{EQ (21)}$$

Then the system is rotated about the axis C of the articulated arm by $$\text{ROT-AXIS (3, 1, angle C, EYE-DIR)} \quad \text{EQ (22)}$$

and the system is translated along the length of arm 24 by $$\text{VRAD (length 24, point 2, EYE-DIR [1], point 3)} \quad \text{EQ (23)}$$

At this time point 3, which is the origin of the translated and rotated frame of reference, is on axis D at the center of rotation of axis E of FIG. 1 and EYE-DIR [1] points in the direction of the probe, which is along the longitudinal extent of shaft 28.

Now the coordinate system is rotated first about the D axis and then about the E axis. As there is no length along the D axis, no translation is needed.

$$\text{ROT-AXIS (2, 3, angle D, EYE-DIR)} \quad \text{EQ (24)}$$

$$\text{ROT-AXIS (3, 1, angle E, EYE-DIR)} \quad \text{EQ (25)}$$

Finally, knowing that the length to the top of the probe is 3.0" in this example, the reference system may be translated by this amount to the point from which the tube centerline X,Y offsets are measured.

$$\text{VRAD (3.0, point 3, EYE-DIR [1]), EYE-POINT)} \quad \text{EQ (26)}$$

Now EYE-DIR [1] is the X axis in the probe plane and points in the direction of the probe, that is, along the probe the axis of shaft 28. The latter is EYE-DIR [2], which is the Y axis employed in the calculations illustrated in FIGS. 6 and 7. EYE-DIR [2] points perpendicular to the EYE-DIR [1] but is still in the plane of the probe, so that EYE-DIR [1] and EYE-DIR [2] define the probe plane, and EYE-DIR [3] points in a direction perpendicular to the probe plane.

To find the actual X,Y,Z coordinates of a point on the tube centerline, the X,Y offsets of the tube centerline relative to the probe reference point are added to the probe X,Y,Z coordinates. The probe offset is added to the probe X,Y,Z positions by $$\text{VRAD (X, EYE-POINT, EYE-DIR [1], tube-CL)} \quad \text{EQ (27)}$$

The Y offset Y is added by $$\text{VRAD (Y, tube-CL, EYE-DIR [2], tube-CL)} \quad \text{EQ (28)}$$

where tube-CL represents the point on the tube centerline in the probe plane. Now the point tube-CL is at the centerline of the tube in the machine or table fixed reference system.

It will be seen that new and improved apparatus and methods for non-contact measuring of tubes and similar objects have been disclosed wherein a single relatively small size non-contact probe is capable of measuring either very small diameter objects or objects having a diameter too large entirely to enter the probe opening. Measurements are made rapidly, without contact with the object being measured. Nor is it necessary to cause the probe to approach the tube and the measuring position along any known path, nor to know or control the path or velocity of such approach. A large number of points on the centerline of a tube are measured and effectively averaged to define a centerline with a precision that is less susceptible to local anomalies in the exterior surface of the object being measured. Thus, local changes in reflectivity, dents or local deformations of the tube which could possibly give erroneous readings, are effectively averaged out. The apparatus and methods are relatively insensitive to ambient light or spurious reflections, and the apparatus is lighter, smaller, more accurate and more easily aligned and calibrated, having fewer parts and less stringent tolerances.

The foregoing detailed description is to be clearly understood as given by way of illustration and example only, the spirit and scope of this invention being limited solely by the appended claims.

What is claimed is:

1. An optical probe comprising:
   a working head,
   first and second mutually spaced light sensors mounted to said working head,
   first and second point light sources mutually spaced from each other and from said sensors mounted to said working head, said light sources configured and arranged to project first and second light beams toward said first and second sensors, respectively, though a sensitive region adjacent said sensors,
   both said sensors having at least portions thereof occluded by presence in said sensitive region of an occluding object of which position is to be measured, and
   means responsive to said sensors for generating a set of signals that collectively define position of an occluding object relative to said working head in a reference system fixedly related to the working head.

2. The optical probe of claim 1 wherein said sensors comprise first and second linear arrays of photosensitive elements and wherein said light sources comprise first and second lasers having relatively wide beams projected through said sensitive region.

3. The optical probe of claim 1 wherein said working head comprises a body having first and second end portions and first and second inner portions, said sensors comprising linear arrays of light sensitive elements respectively mounted at said first and second inner portions and facing respective ones of said end portions, said point light sources being mounted at respective ones of said end portions and being directed toward said first and second sensors respectively, said point light sources having relatively wide beams projected to illuminate at least major lengths of respective ones of said arrays.

4. The optical probe of claim 1 wherein said working head comprises a body having first and second arms having inner and outer ends, means for fixedly connecting inner ends of said arms to one another, said sensors being mounted to said inner ends of said first and second arms respectively, said point light sources being mounted to the outer ends of said first and second arms respectively, said outer ends being spaced from each other to define a probe entrance for reception of an object into said sensitive region.

5. The optical probe of claim 1 wherein said working head includes a probe body having first and second arms connected to one another at inner ends thereof and having outer ends, said first and second sensors being mounted to said first and second arms respectively at said inner ends thereof, said light sources comprising first and second laser diodes mounted to said outer ends respectively.

6. The optical probe of claim 5 wherein said first and second arms extend substantially at right angles to one another and wherein said first and second sensors comprise first and second arrays of light sensing elements mounted to said inner ends of the arms and extending substantially parallel to the direction of the respective arms, each said arm having a relatively short inwardly angulated end section, said first and second point light sources comprising first and second laser diode means mounted to said end sections respectively for projecting relatively wide mutually overlapping light beams to said first and second arrays of sensor elements respectively.

7. The optical probe of claim 6 including calibration means comprising a calibration recess formed in each of said arms at a known position relative to respective ones of said arrays, each said recess being configured to receive and position an elongated calibration element.

8. The optical probe of claim 1 comprising first calibration means on said working head between said first light source and said first sensor, and second calibration means on said working head between said second light source and said second sensor.

9. The optical probe of claim 8 wherein each said calibration means comprises a part of said working head fixedly positioned relative to a respective one of said sensors, and an aperture in each said part adjacent a respective sensor and adapted to receive and locate an elongated calibration member.

10. A method for measuring position of the centerline of a tube comprising the steps of:
providing a working head having first and second mutually spaced emitting sections and first and second mutually spaced receiving sections defining a sensitive region between the receiving sections and the emitting sections,
projecting broad beams of light from first and second point sources on said first and second emitting sections toward said first and second receiving sections respectively and through said region,
positioning a tube within said region, thereby occluding portions of said receiving sections relative to light projected from said emitting sections, and
generating a set of signals representing positions relative to said working head of a point on the centerline of the tube.

11. The method of claim 10 wherein said step of positioning a tube comprises the step of positioning the tube with its entire cross sectional area within said sensitive region.

12. The method of claim 10 wherein said step of positioning the tube comprises the step of positioning the tube with a first portion of its cross section within said sensitive region and with a second portion of the tube cross section outside of said sensitive region.

13. The method of claim 10 wherein said step of generating a set of signals comprises the steps of defining first and second tangents to said tube from said first and second point sources while said receiving sections are partially occluded by said tube.

14. The method of claim 10 wherein said step of generating a set of signals comprises the step of defining first and second tangents to said tube extending from said first and second point sources respectively while said receiving sections are partially occluded, and employing said tangents to calculate coordinate position of a point on the tube centerline relative to said working head.

15. The method of claim 10 wherein said step of generating a set of signals further comprises the step of determining an angle of skew between said working head and the centerline of said tube, and correcting said coordinate position of the point on the tube centerline in accordance with said skew angle.

16. The method of claim 10 wherein said step of positioning a tube within said sensitive area comprises the steps of moving the working head in a scan path along a section of said tube, wherein said step of generating a set of signals comprises the steps of defining, at each of a plurality of scan points along said scan path, a pair of tangents to the tube extending from said first and second emitting sections respectively, generating at each of said plurality of scan points a set of orientation signals representing orientation of the working head, employing the tangents at each of said scan points to compute coordinates of a point on the centerline of the tube, employing the coordinates of a plurality of said centerline points to determine orientation and position of the tube centerline, computing for each of a group of said plurality scan points the skew angle between said tube centerline and the working head, and correcting at least some of said computed centerline point coordinates in accordance with said skew angles.

17. The method of claim 10 wherein said step of positioning a tube within said sensitive region comprises moving said working head relative to the tube in a scan path extending through a number of scan points along a straight section of the tube, said step of generating a set of signals comprising the steps of defining at each of a plurality of said scan points coordinates of points on the centerline of said tube, and computing a best fit line from a selected group of said coordinates.

18. The method of claim 10 wherein said step of positioning a tube within said sensitive region comprises the steps of moving the working head relative to the tube along a scan path that extends along and in proximity to a section of the tube, said step of generating a set of signals comprising the steps of defining at each of a plurality of scan points in said scan path slopes of first and second tangents to the tube from said first and second point sources, employing said slopes to define approximate coordinates of points on said tube centerline at each of a group of said scan points, employing at least a group of said coordinates to define a first approximate tube centerline, defining at each of said scan points the skew angles between said first approximate tube centerline and said working head, employing said skew angles to define corrected coordinates of said points on said tube centerline, and defining a corrected tube centerline from a group of said corrected coordinates.

19. A method of measuring position of the centerline of a tube comprising the steps of:
providing a working head having a sensitive region in which a measurement is to be made,
providing first and second point light sources on said working head to illuminate said sensitive region,
mounting first and second light sensors to said working head positioned to have overlapping fields of view for reception of light projected from said first and second light sources respectively and passing through said sensitive region,
causing said first and second light sources to project first and second light beams through said sensitive region and toward said first and second light sensors respectively,
positioning a tube of which position is to be measured at least partly within said sensitive region, thereby partially occluding the fields of view of respective light sensors in accordance with position of the tube within said sensitive region to provide occluded areas, said occluded areas having edges lying on first and second tangents to the tube from said first and second light sources respectively,
measuring slopes of said tangents, and
employing said slopes to generate a set of electrical signals defining coordinates of a point on the centerline of the tube.

20. The method of claim 19 wherein said working head includes first and second arms having inner ends connected to one another and having outer end sections, said step of providing light sensors comprising the steps of mounting said sensors at inner ends of respective ones of said arms and directing the field of view of each said sensor toward a respective one of said arm end sections, and wherein said step of projecting light beams from said light sources comprises the step of providing said first and second light sources at said first and second end sections respectively and projecting relatively wide light beams from said light sources toward said inner ends of said arms.

21. The method of claim 19 wherein said step of positioning a tube comprises positioning the pipe with a part of its cross section outside of said sensitive region, and a part of its cross section within said sensitive region, and wherein said step of measuring slopes is carried out by measuring areas of said sensors from said occluded area edges.

22. The method of claim 21 wherein said step of employing said slopes to generate a set of electrical signals comprises the steps of defining a skew angle between said working head and centerline of the tube and employing the skew angle to calculate corrected coordinates of said point on the centerline of said tube.

23. A measuring instrument comprising:
a support,
a probe, including means for sensing position of a tube relative to said probe,
an articulated arm mounting the probe to the support for movement with components of rotation about a plurality of mutually angulated axes,
said probe being adapted to move in a scanning path relative to a tube to be measured,
means responsive to said articulated arm and probe for generating sets of signals that collectively define three dimensional coordinates of points on a tube positioned to be sensed by said probe, said means for generating sets of signals comprising:
means responsive to said probe for generating tangent data defining first and second tangents to said tube from said probe,
means responsive to articulation of said arm for generating probe location data defining location and orientation of the probe,
means for repetitively sampling said data at successive scan points along said scanning path,
means responsive to said sampled data for computing coordinate data sets representing approximate coordinates of a plurality of points on the centerline of a tube to be measured,
means responsive to said sets of signals for computing skew angles between said probe and said tube at each of a plurality of said points along said scanning path, and
means responsive to said coordinate data sets and said skew angles for computing corrected coordinate data sets representing corrected coordinates of points on the tube to be measured.

24. The instrument of claim 23 wherein said means for computing skew angles comprises means for selecting a best fit line through points defined by said approximate coordinates, and wherein said means for computing corrected coordinate data sets comprises means for selecting a corrected best fit line through points defined by said corrected coordinate data sets.

25. The instrument of claim 24 including means for computing corrected skew angles between said corrected best fit line and the probe, means responsive to said corrected skew angles for computing second corrected coordinate data sets representing second corrected coordinates of points on the tube to be measured, and means for selecting a second corrected best fit line through said points defined by said second corrected coordinates.

26. A method of defining the centerline of a tube comprising the steps of:
moving a probe to a plurality of positions along the tube,
generating sets of orientation signals at said positions, each set of signals defining orientation of said probe in a fixed coordinate system at each of said positions, respectively,
measuring, at each of said positions, tangent data defining slopes of pairs of tangents to said tube from first and second mutually spaced locations on said probe,
generating sets of coordinate signals at said positions based upon said tangent data, tube diameter, and an assumed perpendicular relation between the probe and the tube centerline, each said set of coordinate signals defining approximate coordinates of a point on the centerline of the tube,
employing said sets of orientation and coordinate signals to define an approximate centerline of the tube,
generating sets of corrected coordinate signals defining corrected coordinates of points on the centerline of the tube corrected for the angular relation of the tube centerline and probe orientations, and
employing said sets of corrected coordinate signals to define a corrected tube centerline.

27. The method of claim 26 wherein the probe has a sensitive region lying in a probe sensing plane, and wherein the tube centerline has a tube end point that is to be defined, and including the steps of moving the probe from a point displaced from the tube and beyond the tube end point toward an end of the tube in a direction along the tube centerline until the tube end penetrates the probe sensitive region, generating a first set of probe data at the time of initial penetration of the tube end into the probe sensitive region, employing said first set of probe data to define a first point on the centerline of said tube in said probe sensing plane, calculating the angle between the tube centerline and the probe sensing plane, and employing said angle to generate data that defines the distance between said first point and the tube end point.

28. A method of determining the centerline of a tube by using a probe that projects light toward light sensors through a probe sensitive area at which a tube to be measured is positioned, said method comprising the steps of:

moving the probe to at least two positions mutually spaced along and in proximity to a length of tube to be measured, positioning at least a part of said tube in said probe sensitive area at each of said positions;

employing the probe at each of said positions to measure slopes of first and second tangents to the tube from points on the probe, and calculating from said measured slopes, and for each of said positions, sets of offsets of first and second points on the tube centerline relative to said probe.

29. The method of claim 28 wherein in each said position, the tube casts a shadow on and only partially occludes each of said light sensors, said shadows having edges thereof on said tangents, and wherein said step of employing the probe to measure slopes comprises measuring a length of each sensor to a respective shadow edge.

30. The method of claim 28 wherein slopes of said first and second tangents are measured at the same time.

31. The method of claim 28 wherein said step of moving the probe comprises moving the probe in a scan path through said positions, and defining a best fit line for points on the tube centerline.

32. The method of claim 31 wherein said probe has a measurement plane, and including the step of defining orientation of said probe measurement plane when said probe is employed to measure said slopes, calculating skew angles between said probe measurement plane and said best fit line, and defining corrected points on the tube centerline based on said skew angles.

33. The method of claim 32 wherein said step of moving the probe in a scan path comprises positioning part of the periphery of the tube within said probe sensitive area, and positioning part of the periphery of the tube outside of said probe sensitive area, so that only portions of said light sensors are occluded.

34. The method of claim 28 including the steps of computing skew angles between the probe and the tube centerline at each of said positions, and re-calculating said sets of offsets based on said measured skew angles.

35. For use with an optical probe comprising a probe body having a sensitive region lying in a sensing plane and optical means for generating signals in response to presence of an object to be measured in the sensitive region, said probe being configured to move in a selected path toward an object to be measured, and having means for generating data defining position and orientation of the probe, a method for determining the end point of a tube comprising the steps of:

generating data defining a centerline of a tube of which the end point it to be determined, moving the probe from a point displaced from the tube and beyond the tube end point toward the tube in a direction along the tube centerline until the tube end penetrates the probe sensing plane and sensitive region, generating a first set of probe signals at the time of initial penetration of an end of the tube into the probe sensitive area, employing said first set of signals to produce data defining a first point on the centerline of said tube in said probe sensing plane, calculating the skew angle between the tube centerline and the probe plane, and employing said skew angle to generate data that defines the distance between said first point and the tube end point.

36. A method of measuring the centerline of a straight section of a tube employing an optical probe that is movable in a scan path along the tube, said probe having a sensitive region lying in a probe sensing plane, said method comprising the steps of:

(a) moving the probe in a scan path along the tube, with the tube positioned so that at least a part of its periphery extends into said sensitive region of the probe, (b) generating sets of probe location data at each of a plurality of positions along said scan path, said probe location data defining location of the probe in a fixed coordinate system, (c) causing the probe to generate camera data at each of said plurality of positions, said camera data comprising data defining first and second tangents to the tube from points on the probe, (d) converting the camera data to sets of offsets in said sensing plane of the centerline of the tube relative to a probe coordinate system, (e) converting the probe location data to probe coordinates defining location of the probe in the fixed coordinate system, (f) combining the probe coordinates with the offsets to define sets of approximate centerline coordinates of points on the centerline of the tube in the fixed coordinate system, for a group of said positions along said scan path, (g) storing the approximate centerline coordinates, (h) storing the probe location data, (i) employing the approximate centerline coordinates to determine an approximate best fit line through points on tube centerline, (j) computing skew angles between the probe sensing plane and said approximate best fit line for each position of said group, (k) calculating corrected sets of approximate centerline coordinates for each position of said group based upon said skew angles, (l) determining a corrected best fit line through points defined by the corrected sets of approximate centerline coordinates, and (m) repeating steps (j) through (l), employing in step (j) the corrected best fit line calculated in step (l).

37. The method of claim 36 including the step of moving the probe in a direction of the tube centerline toward the tube from a position beyond an end of the tube to an end position at which the tube end initially penetrates the probe sensing plane, at such end position measuring orientation and position of the probe, computing the skew angle between the probe sensing plane at said end position and said best fit line, generating coordinate data defining the intersection of said best fit line with the probe sensitive plane at said end position, employing said skew angle and the tube diameter to determine an end point correction for tube diameter, said correction comprising the distance between (a) the intersection of the best fit line and the probe plane, and (b) the end point of the tube.

* * * * *